United States Patent [19]

Kohda

[11] Patent Number: 5,675,374
[45] Date of Patent: Oct. 7, 1997

[54] VIDEO TELECONFERENCING SYSTEM

[75] Inventor: Youji Kohda, Kawasaki, Japan

[73] Assignee: Fujitsu Limited, Kawasaki, Japan

[21] Appl. No.: 299,112

[22] Filed: Sep. 2, 1994

[30] Foreign Application Priority Data

Nov. 26, 1993 [JP] Japan ............ 5-296534

[51] Int. Cl.⁶ ........................... H04N 7/15
[52] U.S. Cl. ........................ 348/15; 348/20
[58] Field of Search ............ 348/15, 14, 16, 348/17, 18, 19, 20; 379/96, 202, 203, 204, 205, 206, 53, 54; H04N 7/15, 7/14

[56] References Cited

U.S. PATENT DOCUMENTS

| 5,036,390 | 7/1991 | Masunaga | 348/14 |
| 5,257,306 | 10/1993 | Watanabe | 348/15 |
| 5,291,556 | 3/1994 | Gale | 348/15 |

FOREIGN PATENT DOCUMENTS

| 0043285 | 2/1987 | Japan | H04N 7/14 |
| 0160283 | 6/1989 | Japan | H04N 7/14 |
| 0293058 | 11/1989 | Japan | 379/53 |
| 0125588 | 5/1990 | Japan | H04N 7/15 |
| 405022723 | 1/1993 | Japan | H04N 7/15 |
| 405316504 | 11/1993 | Japan | H04N 7/15 |

OTHER PUBLICATIONS

Sellen, "Speech Patterns in Video-Mediated Conversations," *CHI '92*, May 3–7, 1992, pp. 49–59.

Kouno et al., "Shared Desk with ScopeHand," NTT Human Interface Laboratories, 42–6, May 11, 1992, pp. 39–46.

*Primary Examiner*—Curtis Kuntz
*Assistant Examiner*—Stella Woo
*Attorney, Agent, or Firm*—Staas & Halsey

[57] ABSTRACT

A video teleconferencing system is adapted to make a video conference among a plurality of participants located at different work locations. The video teleconferencing system includes a plurality of image pickup devices provided at each work location for picking up the participant at each work location, a plurality of image displays provided at each work location for displaying images of the participants, an image converter provided for each work location for converting the image picked up by the image pickup means into a mirror image thereof, and an image selector provided for each work location for selecting the image to be transmitted to the image displays at every work location from the images picked up by the image pickup devices and the mirror images thereof obtained from the image converter.

18 Claims, 9 Drawing Sheets

F I G . 1
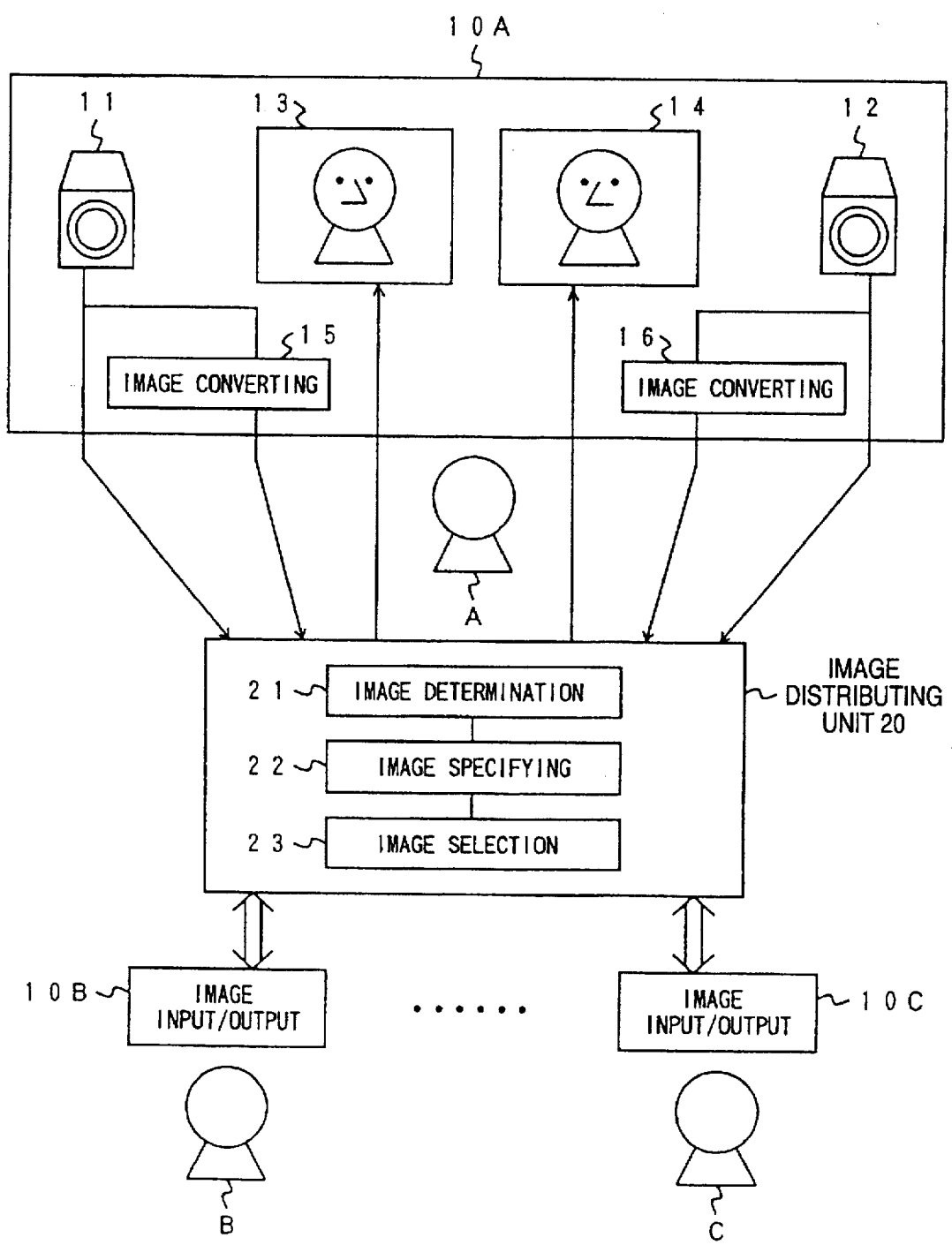

VIDEO TELECONFERENCING SYSTEM

BACKGROUND OF THE INVENTION

The present invention generally relates to video teleconferencing systems, and more particularly to a video teleconferencing system for enabling a video conference among a plurality of participants and suited when applied to a groupware which requires a group work by the participants.

In an environment where personal computers are coupled via a network, it is becoming possible to carry out group work on the personal computers. A software or a computer system which makes such group work possible is often referred to as groupware. In order to supplement the presence of the other participants, faces of the other participants who participate in the group work are displayed on a screen of each of the personal computers of the participants. The displayed image may include or exclude the face of the participant to whom the personal computer belongs. A video teleconferencing system makes the above described group work possible.

In such video teleconferencing systems, there are demands to realize an improved environment for the group work by introducing a more natural presence of the participants.

According to the conventional video teleconferencing systems, the face of the participant is usually picked up from immediately in front of, or from slightly above the participant, by stressing the importance of eye contact (or eye-to-eye contact). In other words, the displayed image is basically a front image of the participant. On the other hand, the faces of the participants who participate in the group work are displayed in one or a plurality of windows in the display screen which also displays the subject of the work, such as text and graphics. For example, the faces of the participants are displayed in a horizontal row or two such rows, and no special relationship exists among the individual displays of the faces. Therefore, the conventional video teleconferencing system is basically the same as providing a number of videophones corresponding to the number of other participants.

Accordingly, the conventional video teleconferencing system stressed importance on eye contact, and was not much different from the videophone because the window was simply divided into 2×2 regions, for example, and the face of a participant was displayed in each of the regions. That is, the front images of the participants were merely displayed in a row or rows.

However, when consideration is given to the conference that is made under the actual presence of all of the participants, each participant does not always stare at the faces of all of the other participants, and it is rare that the participant stares at the face of another participant from immediately in front. Generally, the participants vaguely look at the participant who speaks (speaker), and usually look at the face of the speaker only some of the time. For this reason, the method of picking up the images of the participants in the conventional video teleconferencing system greatly differed from the circumstances of the actual conference.

When each participant has a personal computer and a group work is to be carried out from the personal computers of the participants, the operation may be mainly concerned with the work and the conversation may be secondary or, the operation may be mainly concerned with the conversation and the work may be secondary, depending on the situation. In this specification, a "conference mode" refers to the mode that is mainly concerned with the work and the conversation is secondary, and a "discussion mode" refers to the mode that is mainly concerned with the conversation and the work is secondary.

The discussion mode attaches importance to eye contact. However, according to the conventional video teleconferencing system which merely displays the faces of the participants in one or a plurality of rows, it is impossible to always obtain the desired eye contact. In addition, if only the front image is transmitted to each of the participants, there is a problem in that a participant may think that eye contact exists where no eye contact should actually exist.

On the other hand, eye contact is not essential in the conference mode. In the actual conference where the conversation is straightforwardly made while making progress in the work, it is sufficient if the participants' faces are visible and no eye contact is necessary. It may be regarded that it is unnecessary or difficult to look into the other participant's eyes when straightforwardly making the conversation. In addition, when listening to the other participants make a discussion, one would usually look at these participants' faces from the side, and there will be no eye contact.

Accordingly, in the environment of the group work in which the conference mode and the discussion mode coexist, a situation where the eye contact should be made and a situation where no eye contact is necessary alternately occur. Hence, what is demanded of the video teleconferencing system used for the group work is the capability to provide images of the participants in coordination with the situation where the eye contact should be made and the situation where no eye contact is necessary, so as to cope with the coexisting conference mode and the discussion mode.

However, if two different display systems for displaying the images of the participants are provided in correspondence with the conference mode and the discussion mode, there is a problem in that a troublesome operation of frequently switching the two display systems would be required. It is desirable that each participant does not have to be aware of the transition of the mode and that the display system can cope with any mode. In other words, it is desirable to realize a modeless (or no-mode) display system.

SUMMARY OF THE INVENTION

Accordingly, it is a general object of the present invention to provide a novel and useful video teleconferencing system in which the problems described above are eliminated.

Another and more specific object of the present invention is to provide a video teleconferencing system adapted to produce a video conference among a plurality of participants located at different work locations, comprising a plurality of image pickup means, provided at each work location, for picking up the participant at each work location, a plurality of image display means, provided at each work location, for displaying images of the participants, image conversion means, provided for each work location, for converting the image picked up by the image pickup means into a mirror image thereof, and image selection means, provided for each work location, for selecting the image to be transmitted to the image display means at every work location from the images picked up by the image pickup means and the mirror images thereof obtained from the image conversion means. According to the video teleconferencing system of the present invention, it is possible to carry out a group work under an atmosphere as if all of the participants are present at one place, and the presence of the group work is improved.

3

Other objects and further features of the present invention will be apparent from the following detailed description when read in conjunction with the accompanying drawings.

BRIEF DESCRIPTION OF THE DRAWINGS

FIG. 1 is a system block diagram for explaining the operating principle of the present invention;

DESCRIPTION OF THE PREFERRED EMBODIMENTS

Figure 2:
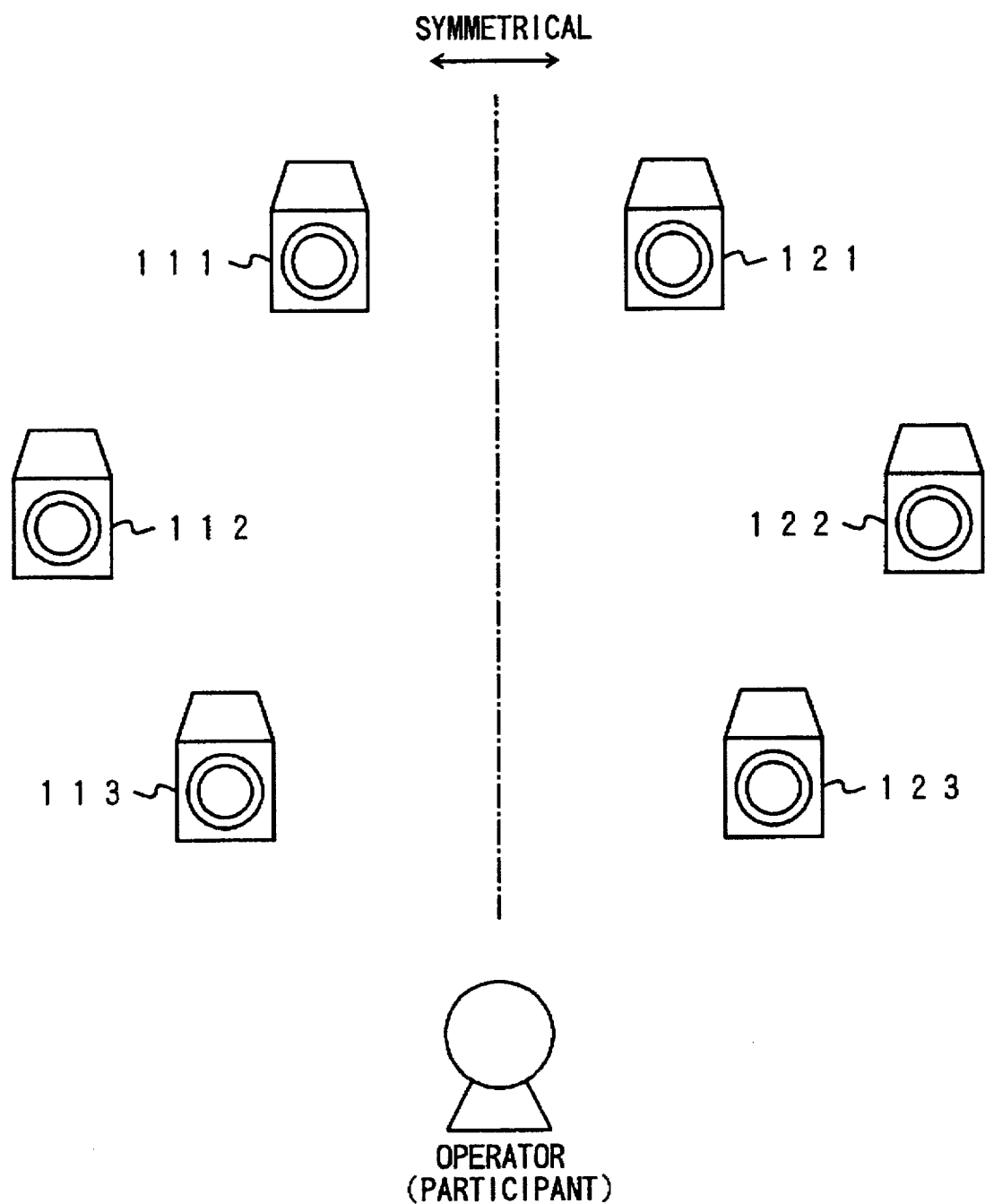
FIG. 2 is a diagram showing an embodiment of an arrangement of image pickup means.

First, a description will be given of the operating principle of the present invention, by referring to FIG. 1.

As shown in FIG. 1, a video teleconferencing system according to the present invention includes an image distributing unit 20 and image input/output units 10A, 10B, 10C, . . . in correspondence with respective operators or participants A, B, C, . . . so that a video conference may be made by two or more participants at separated work locations. Only the construction of the image input/output unit 10A is shown in FIG. 1, but each of the image input/output units 10A, 10B, 10C, . . . include a left image pickup means 11 for picking up an image of the participant from the left, right image pickup means 12 for picking up the image of the participant from the right, left image display means 13 arranged on the left, right image display means 14 arranged on the right, image converting means 15 for converting the image picked up by the left image pickup means 11 into a mirror image thereof, and image converting means 16 for converting the image picked up by the right image pickup means 12 into a mirror image thereof. These image converting means 15 and 16 may be provided within the image distributing unit 20.

A plurality of the image pickup means 11 and the image pickup means 12 may be provided. The image pickup means 11 and 12 are made up of a plurality of video cameras which are arranged in a mutually line symmetrical plane arrangement or in a plane symmetrical three-dimensional arrangement.

On the other hand, a plurality of the image display means 13 and the image display means 14 may be provided. The image display means 13 and 14 are made up of a plurality of displays which are arranged in a mutually line symmetrical plane arrangement or in a plane symmetrical three-dimensional arrangement. Alternatively, the image display means 13 and 14 are formed by a plurality of sections of one or more windows displayed on at least one display screen.

4

When there are N work locations where the participants A, B, C, . . . are stationed, where N<2, M image display means 13 and 14 are provided at each work location, where 2>M>N. The image distributing unit 20 is provided with image determination means 21 for determining the images to be displayed on the M image display means 13 and 14 out of the images received from the N work locations. This image determination means 21 determines, as the images to be transferred to each work location, the images received from the N work locations where speeches have most recently been made, based on records of the speakers.

The image distributing unit 20 is also provided with image selection means 23 and image specifying means 22. The image selection means 23 selects the images to be transmitted to the plurality of image display means 13 and 14 at each work location, out of the images picked up by the plurality of image pickup means 11 and 12 and the mirror images thereof obtained from the image conversion means 15 and 16. The image specifying means 22 specifies the images to be selected with respect to the image selection means 23. When the images to be transmitted to the image display means 13 and 14 of each of the image input/output units 10A, 10B, 10C, . . . are the images picked up at the work location where these image display means 13 and 14 are provided, the image specifying means 22 specifies the mirror image from the image conversion means 15 or the image conversion means 16 as the image to be selected, and accordingly controls the image selection means 23.

The image specifying means 22 specifies the mirror image with respect to the image selection means 23 when displaying the image picked up by the left image pickup means 11 on the left image display means 13, and specifies the non-mirror i.e. direct images image with respect to the image selection means 23 when displaying the image picked up by the left image pickup means 11 on the right image display means 14. On the other hand, the image specifying means 22 specifies the non-mirror image with respect to the image selection means 23 when displaying the image picked up by the right image pickup means 12 on the left image display means 13, and specifies the mirror image with respect to the image selection means 23 when displaying the image picked up by the right image pickup means 12 on the right image display means 14.

In addition, although the illustration is omitted in FIG. 1, each work location is also provided with at least one voice collecting means, acoustic image reproducing means for reproducing the sounds at a plurality of positions at each work location, and acoustic image synthesizing means for synthesizing the acoustic images including the sounds collected at each of the work locations and outputting the synthesized acoustic image to each acoustic image reproducing means.

The face of the participant (or operator) who faces the screen of the personal computer, work station or the like, is picked up from the right or left, so as to obtain the image of the participant's face facing in an oblique direction. In other words, the image of the participant other than the front view is obtained. The oblique images of several participants are displayed in an arrangement such that these participants look as if they are facing each other. It is possible to always display all of the participants. Alternatively, it is possible to select arbitrary participants to be displayed depending on the speeches made, for example, so that the displayed images are appropriately switched depending on the situation.

The image conversion means 15 and 16 are provided to invert the images picked up by the image pickup means 11 and 12 i.e. direct image so as to obtain the mirror images thereof. In addition, appropriate images may be selected from the picked up images and the mirror images thereof by the image selection means. Therefore, it is possible to make the display in the following manner as described under 1)–5) below.

1) When displaying the image picked up by an arbitrary image pickup means 11 (12) on the image display means 13 (14) at the work local location of this arbitrary image pickup means 11 (12), the mirror image of the picked up image is obtained by the image conversion means 15 (16) and is displayed.

2) When displaying the image picked up by the left image pickup means 11 one (i.e. a remote on the left image display means 13 at another work location under the instruction of the image specifying means 22, the image picked up by the left image pickup means 11 is converted into the corresponding mirror image by the image conversion means 15, and this mirror image is displayed on the left image display means 13.

3) When displaying the image picked up by the left image pickup means 11 at one (i.e. the local work location on the right image display means 14 at another (i.e. remote) work location under the direct instruction of the image specifying means 22, the image picked up by the left image pickup means 11 is displayed i.e. after as it is on the right image display means 14.

4) When displaying the image picked up by the right image pickup means 12 of one (i.e. the local work location on the left image display means 13 at another (i.e.) remote work location under the instruction of the direct image specifying means 22, the image picked up by the right image pickup means 12 is displayed i.e. as it is on the left image display means 13.

5) When displaying the image picked up by the right image pickup means 12 on the right image display means 14 of one (i.e. the local) work location at another work location under the instruction of the image specifying means 22, the image picked up by the right image pickup means 12 is converted into the corresponding mirror image by the image converting means 16, and this mirror image is displayed on the right image display means 14.

By making the display as described above under 1), when the participant himself watches his own image that is displayed at a local work location this participant can see his mirror image so that it is as if this participant looked into a mirror.

By making the display as described above under 2)–5), it is possible to display the images of the participants so that the participant displayed on the left image display means 13 and the participant displayed on the right image display means 14 face each other.

By providing the image determination means 21 in the image distributing unit 20, it is possible to cope with a number of image display means 13 and 14 smaller than N even when N participants perform the group work. Particularly, when the record of the most recent speaker is taken and for distributing the image that is received from the work location where the most recent speech has been made, it becomes possible to display the participants who are participating in the conversation or discussion with priority over other participants who are not.

In addition, by using the acoustic image orientation technique, the acoustic image including the sounds collected at each of the work locations can be synthesized and reproduced by the acoustic image reproducing means that is provided at each work location. In this case, it is possible to further improve the presence of the participants at each work location together with the displays made on the plurality of image display means 13 and 14, because the voice of the participant displayed on the left image display means 13 is synthesized so that this voice is heard from the left, due to the acoustic image orientation, and the voice of the participant displayed on the right image display means 14 is synthesized so that this voice is heard from the right, likewise due to the acoustic image orientation.

FIG. 2 is a diagram showing an embodiment of the arrangement of the image pickup means in a first embodiment of the video teleconferencing system according to the present invention.

In FIG. 2, the plurality of image pickup means are formed by video cameras 111 through 113 arranged on the left, and video cameras 121 through 123 arranged on the right. The video cameras 111 through 113 and the video cameras 121 through 123 are arranged in a mutual, line symmetrical plane arrangement or in a plane symmetrical three-dimensional arrangement. Hence, it is possible to pick up natural images with the same weight regardless of whether the image of the participant is picked up from the left or from the right.

Figure 3:
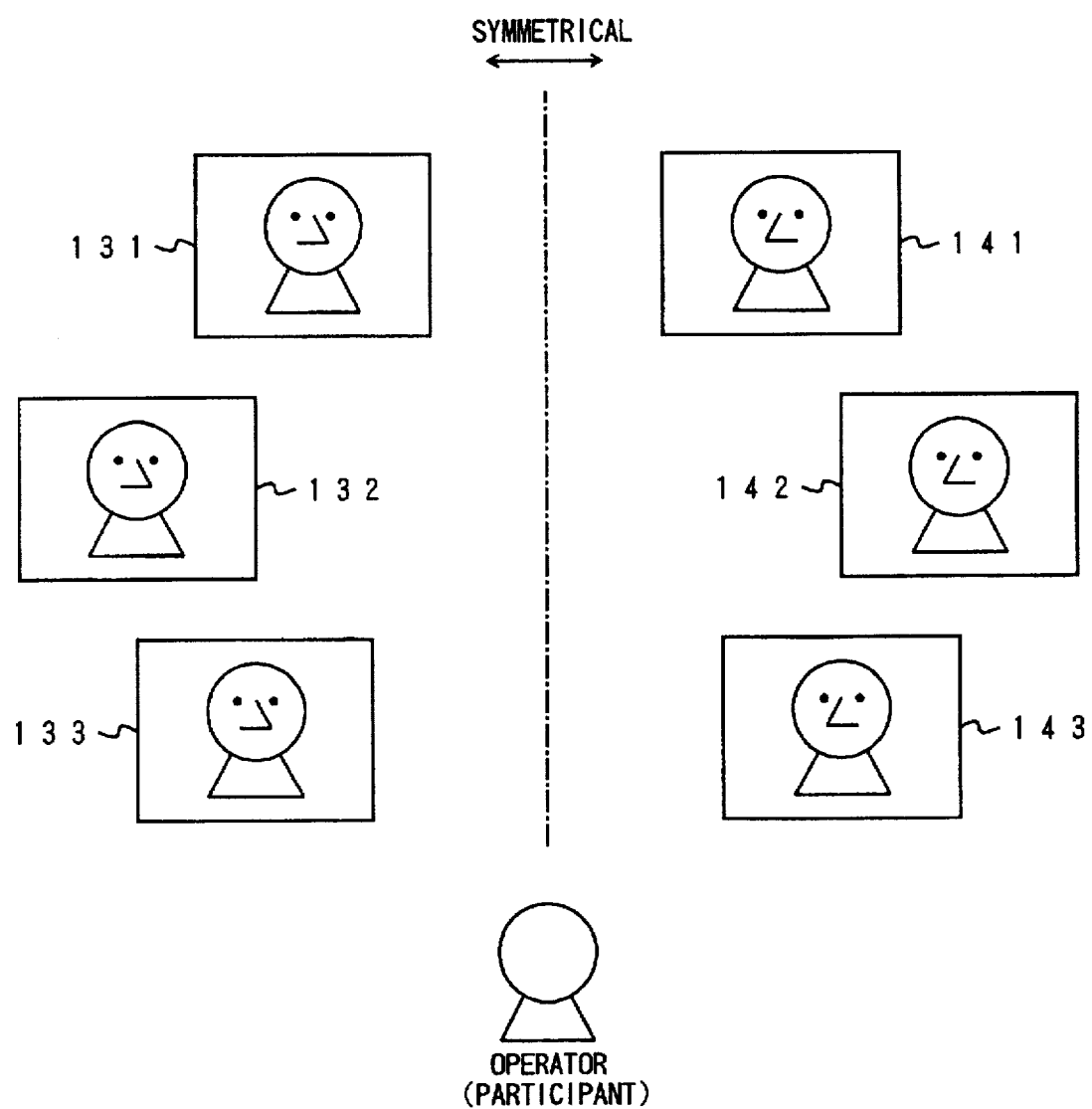
FIG. 3 is a diagram showing an embodiment of an arrangement of image display means.

FIG. 3 is a diagram showing an embodiment of the arrangement of the image display means in the first embodiment of the video teleconferencing system according to the present invention.

In FIG. 3, the plurality of image display means are formed by displays 131 through 133 arranged on the left, and displays 141 through 143 arranged on the right. The displays 131 through 133 and the displays 141 through 143 are arranged in a mutual, line symmetrical plane arrangement or in a plane symmetrical three-dimensional arrangement. Hence, it is possible to view natural images with the same weight regardless of whether the image of the participant is displayed on the left or on the right. Of course, each display means may be formed by a window of a display screen instead of the display.

Figure 4:
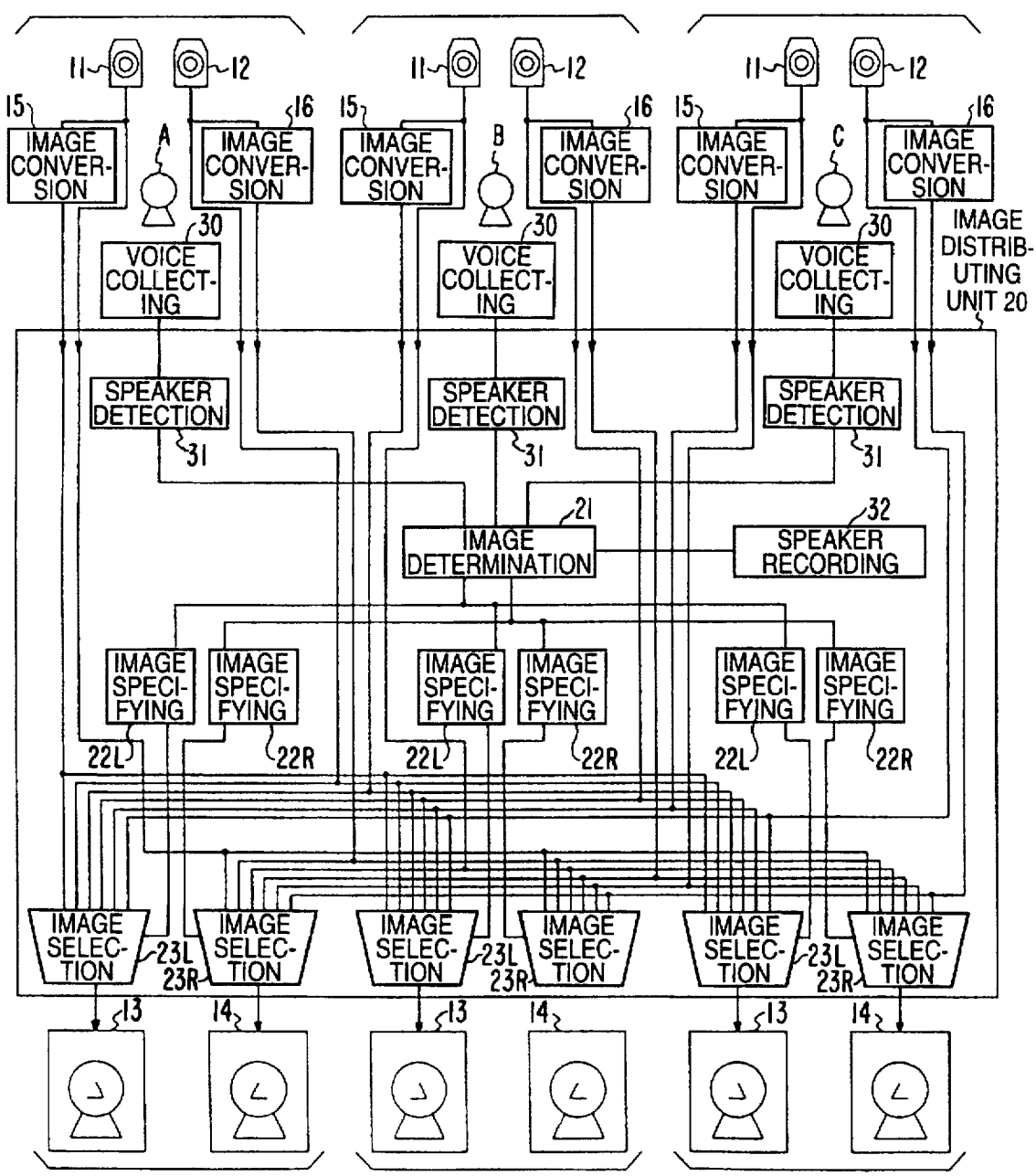
FIG. 4 is a system block diagram showing a first embodiment of a video teleconferencing system according to the present invention.

FIG. 4 shows the first embodiment of the video teleconferencing system according to the present invention. In FIG. 4, those parts which are the same as those corresponding parts in FIG. 1 are designated by the same reference numerals. FIG. 4 additionally shows voice collecting means 30 for collecting the voice of each participant, a speaker detection means 31 for judging whether or not each participant is speaking, that is, performing as a speaker, and speaker recording means 32 for keeping information related to the recent speaker in the form of a record.

In the particular case shown in FIG. 4, it is assumed for the sake of convenience that the group work is to be performed by three participants A, B and C. Further, it is assumed that one each of the left image pickup means 11, the right image pickup means 12, the left image display means 13, the right image display means 14, the left image conversion means 15, the right image conversion means 16, and the voice collecting means 30 are provided at each work location.

Two participants out of the three participants are selected by detecting the existence of the speech, that is, of one of the speakers, and the two image of the one participant is displayed on the left image display means 13 and the right image display means 14. The left image pickup means 11 and the right image pickup means 12 are arranged in the mutual, line symmetrical plane arrangement so as to be line symmetrical to a vertical line. Similarly, the left image display means 13 and the right image display means 14 are arranged in the mutual, line symmetrical plane arrangement so as to be line symmetrical to the vertical line.

The image distributing unit 20 is provided with the image determination means 21 for determining the two participants to be displayed, based on the detection output of the speaker detection means 31 and the contents of the speaker recording means 32. In addition, the image distributing unit 20 is also provided with left image specifying means 22L, right image specifying means 22R, left image selection means 23L, and right image selection means 23R. The left image specifying means 22L outputs a control signal for specifying one of the images which is obtained from the left image pickup means 11 via the left image conversion means 15, and the image obtained from the right image pickup means 12, based on the determination made in the image determination means 21. The right image specifying means 22R specifies one of the image obtained from the right image pickup means 12 via the right image conversion means 16 and the image obtained from the left image pickup means 11, based on the determination made in the image determination means 21. The left image selection means 23L distributively transfers the specified image to the left image display means 13 of each participant, based on the control signal output from the left image specifying means 22L. In addition, the right image selection means 23R distributively transfers the specified image, to the right image display means 14 of each participant based on the control signal output from the right image specifying means 22R.

Figure 5:
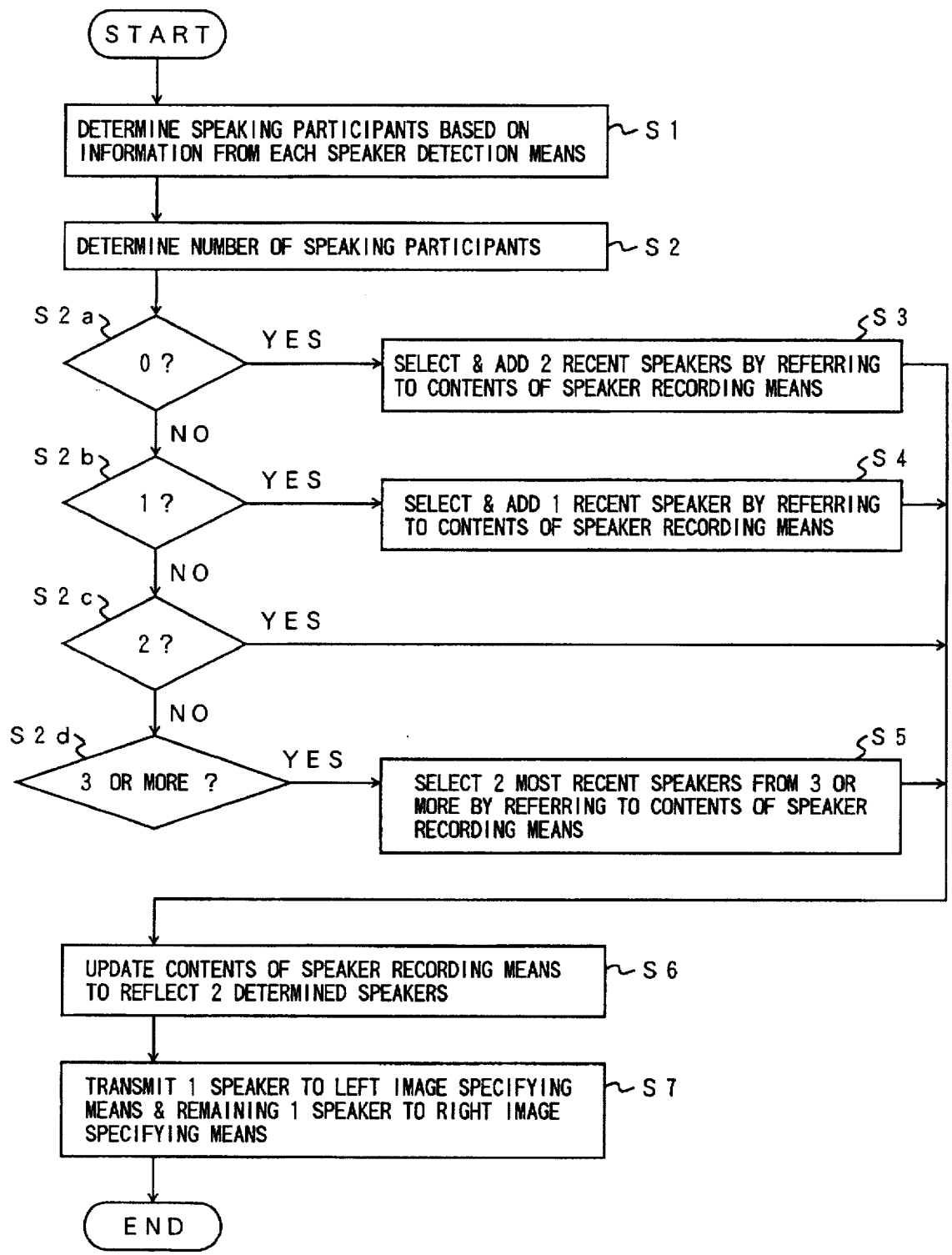
FIG. 5 is a flow chart for explaining the operation of image determination means.

FIG. 5 is a flow chart for explaining the operation of the image determination means 21.

The image determination means 21 determines, out of the three participants A, B and C, the two participants which are respectively to be displayed on the left image display means 13 and the right image display means 14. First, a step S1 shown in FIG. 5 determines the participants who are presently speaking, that is, detects the speakers, based on the information obtained from each of the speaker detection means 31. A step S2 determines the number of participants who are speaking, and steps S3 through S5 are carried out depending on the number of speakers. More particularly, a step S2a decides whether or not the number of speakers is 0. The step S3 is carried out if the decision result in the step S2a is YES. If the decision result in the step S2a is NO, a step S2b decides whether or not the number of speakers is 1. The process S4 is carried out if the decision result in the step S2b is YES. If the decision result in the step S2b is NO, a step S2c decides whether or not the number of speakers is 2. If the decision result in the step S2c is NO, a step S2d decides whether or not the number of speakers is 3 or greater. The step S5 is carried out if the decision result in the step S2d is YES. The process advances to a step S6 after the step S3, S4 or S5 and also if the decision result in the step S2c is YES.

When the number of participants who are presently speaking, that is, the number of speakers, is 0, the step S3 selects the 2 most recent speakers by referring to the contents of the speaker recording means 32, and adds 2 to the number of speakers.

When the number of participants who are presently speaking, that is, the number of speakers is 1, the step S4 selects the 1 most recent speaker by referring to the contents of the speaker recording means 32, and adds 1 to the number of speakers.

When the number of participants who are presently speaking, that is, the number of speakers, is 2, the number of speakers is maintained at 2.

On the other hand, when the number of participants who are presently speaking, that is, the number of speakers is 3 or greater, the step S5 selects the 2 most recent speakers out of the 3 speakers, by referring to the contents of the speaker recording means 32.

After the 2 speakers are determined in the above described manner, the step S6 updates the contents of the speaker recording means 32 so as to reflect this result of determining the 2 speakers.

Then, a step S7 instructs the left image specifying means 22L to display the image of 1 of the 2 speakers (participants) and the right image specifying means 22R to display the image of the remaining 1 of the 2 speakers (participants).

Figure 8:
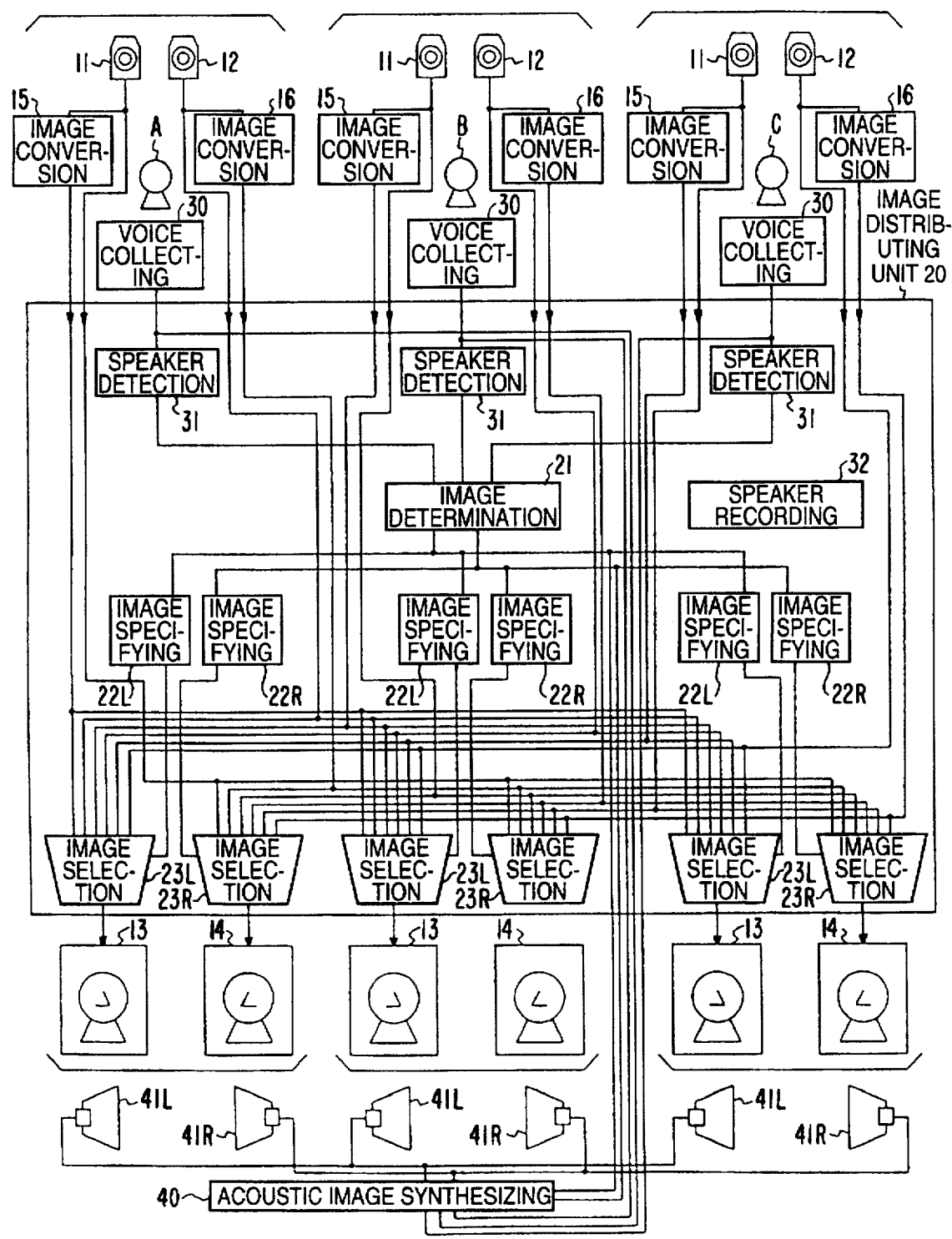
FIG. 8 is a system block diagram showing a second embodiment of the video teleconferencing system according to the present invention.

FIG. 8 is a flow chart for explaining the operation of the left image specifying means 22L.

Figure 6:
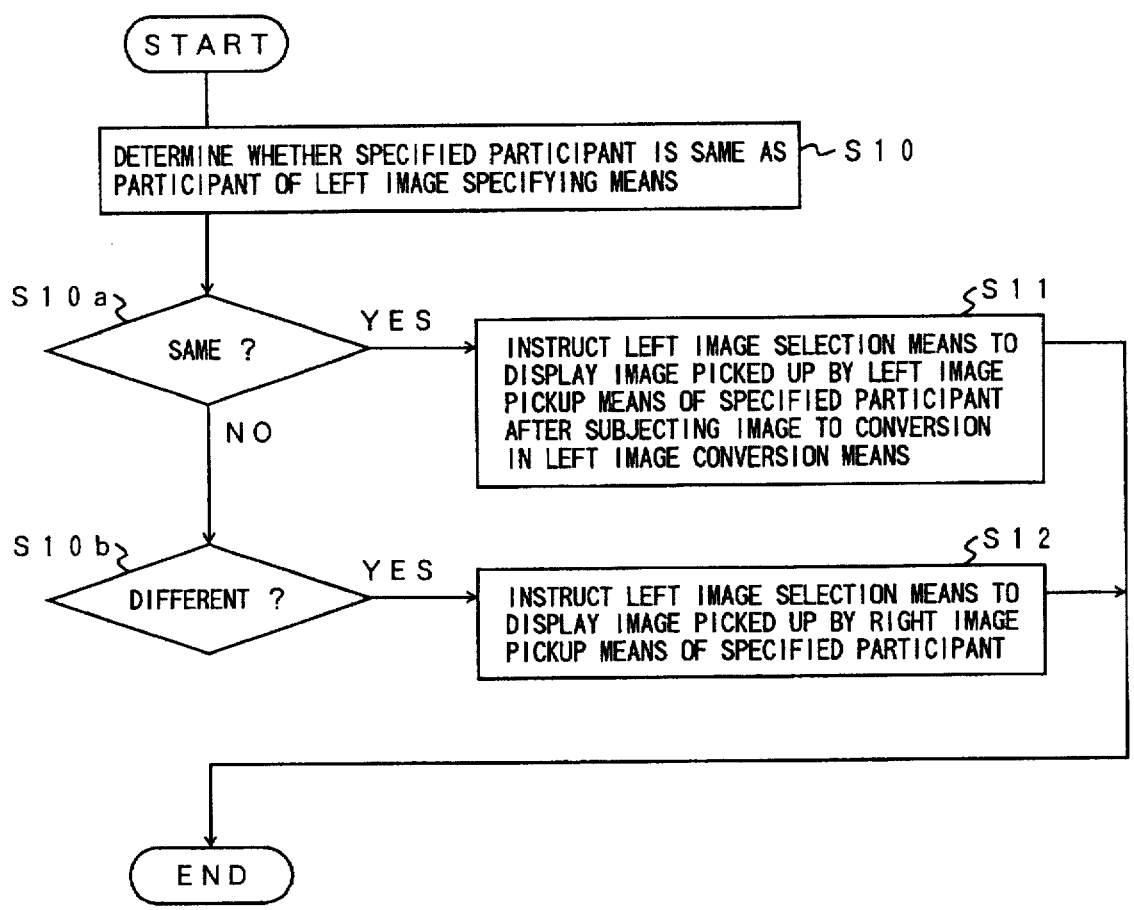
FIG. 6 is a flow chart for explaining the operation of left image specifying means.

Each left image specifying means 22L specifies the image to be displayed with respect to the participant to whom it belongs. Hence, a step S10 shown in FIG. 6 determines whether or not the participant specified by the image determination means 21 is the same participant to whom the left image specifying means 22L belongs. In other words, the step S10 determines whether or not the picked up image and the displayed image are related to the same work location. More particularly, a step S10a decides whether or not the participant specified by the image determination means 21 is the same participant to whom the left image specifying means 22L belongs. A step S11 is carried out if the decision result in the step S10a is YES. If the decision result in the step S10a is NO, a step S10b decides whether or not the participant specified by the image determination means 21 is different from the participant to whom the left image specifying means 22L belongs. A step S12 is carried out if the decision result in the step S10b is YES, and the process ends after the step S11 or S12.

If the participant specified by the image determination means 21 is the same participant to whom the left image specifying means 22L belongs, the step S11 instructs the left image selection means 23L to display the image picked up by the left image pickup means 11 of the specified participant after subjecting this image to the conversion in the left image conversion means 15, so that a mirror image is displayed.

On the other hand, if the participant specified by the image determination means 21 is not the same as the participant to whom the left image specifying means 22L belongs, the step S12 instructs the left image selection means 23L to display the image picked up by the right image pickup means 12 of the specified participant.

Figure 7:
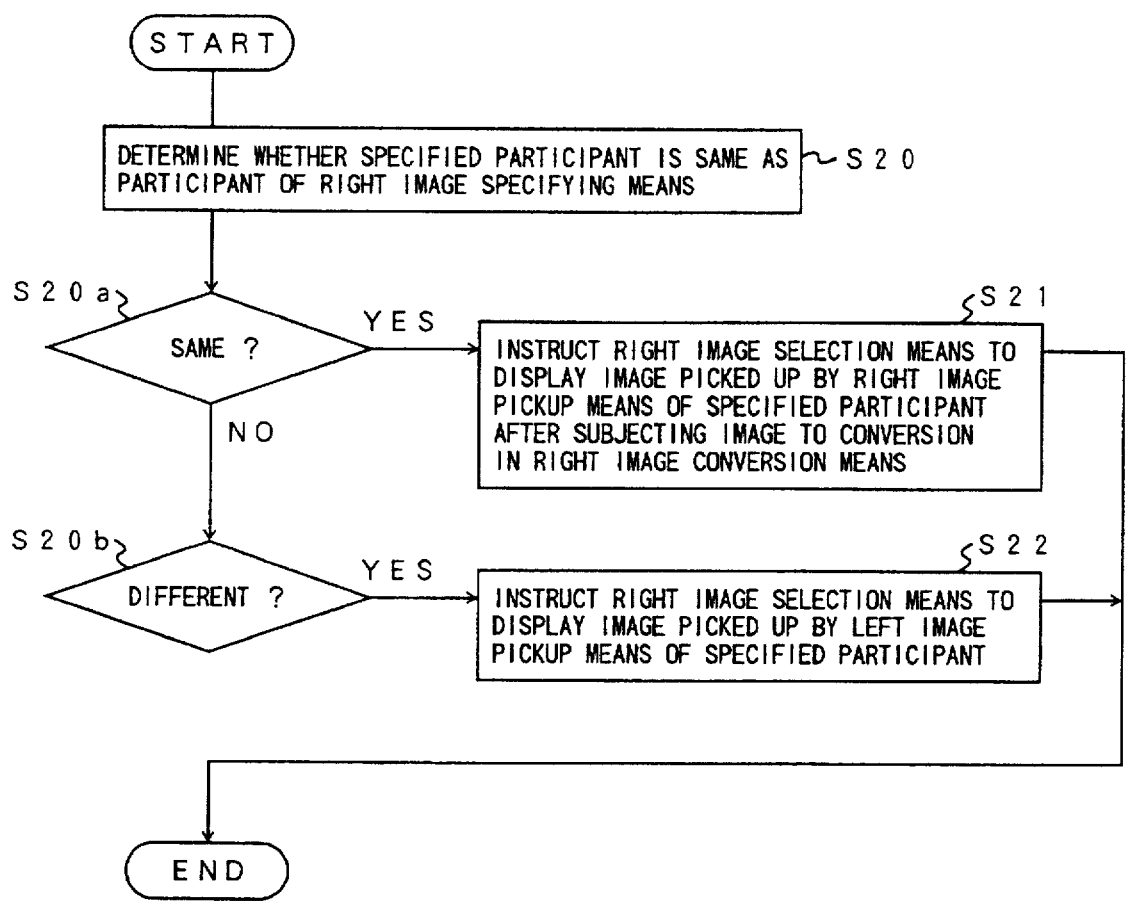
FIG. 7 is a flow chart for explaining the operation of right image specifying means.

FIG. 7 is a flow chart for explaining the operation of the right image specifying means 22R.

Each right image specifying means 22R specifies the image to be displayed with respect to the participant to whom it belongs. First, a step S20 shown in FIG. 7 determines whether or not the participant specified by the image determination means 21 is the same participant to whom the right image specifying means 22R belongs. In other words, the step S20 determines whether or not the picked up image and the displayed image related to the same work location. More particularly, a step S20a decides whether or not the participant specified by the image determination means 21 is the same participant to whom the right image specifying means 22R belongs. A step S21 is carried out if the decision result in the step S20a is YES. If the decision result in the step S20a is NO, a step S20b decides whether or not the participant specified by the image determination means 21 is different from the participant to whom the right image specifying means 22R belongs. A step S22 is carried out if the decision result in the step S20b is YES, and the process ends after the step S21 or S22.

If the participant specified by the image determination means 21 is the same participant to whom the right image specifying means 22R belongs, the step S21 instructs the right image selection means 23R to display the image picked up by the right image pickup means 12 of the specified participant after subjecting this image to the conversion in the right image conversion means 16, so that a mirror image is displayed.

On the other hand, if the participant specified by the image determination means 21 is not the same as the participant to whom the right image specifying means 22R belongs, the step S22 instructs the right image selection means 23R to display the image picked up by the left image pickup means 11 of the specified participant.

As a result, the images of the two participants (speakers) who are presently speaking, as determined by the image determination means 21, are displayed on the left image display means 21 and the right image display means 14 relative to each participant, that is, at each work location, so that the displayed participants face each other. When the participant views his own image on the left image display means 13 or the right image display means 14, the participant will see his mirror image, and it will look to this participant as if he is looking into a mirror. When the participant views the images of the other participants on the left image display means 13 and the right image display means 14, it is possible to see the images of the other participants as if they are actually talking face to face.

Next, a description will be given of a second embodiment of the video teleconferencing system according to the present invention, by referring to FIG. 8. FIG. 8 is a system block diagram showing this second embodiment. In FIG. 8, those parts which are the same as those corresponding parts in FIG. 4 are designated by the same reference numerals, and a description thereof will be omitted. In this second embodiment, a stereo conversation function using the acoustic image orientation is added to the first embodiment described above.

The construction for enabling the stereo conversation includes acoustic image synthesizing means 40, left acoustic image reproducing means 41L arranged on the left of each participant, and right acoustic image reproducing means 41R arranged on the right of each participant. The acoustic image synthesizing means 40 generates the stereo sound in the following manner. That is, the voice which is collected by the voice collecting means 30 of the participant, the image of whom is instructed to be displayed from the image determination means 21 to the left image specifying means 22L, is subjected to sound source orientation to the left with a relatively large volume. The voice which is collected by the voice collecting means 30 of the participant the image of whom is instructed to be displayed from the image determination means 21 to the right image specifying means 22R, is subjected to sound source orientation to the right with a relatively large volume. In addition, the voice which is collected by the voice collecting means 30 of the participant the image of whom is not instructed to be displayed from the image determination means 21 to the left image specifying means 22L nor the right image specifying means 22R, is subjected to sound source orientation to the front inner part with a relatively small volume. Out of the stereo sound which is obtained as a result, the left sound is transmitted to the left acoustic image reproducing means 41L, and the right sound is transmitted to the right acoustic image reproducing means 41R.

Hence, the voice of the participant displayed on the left image display means 13 is heard from the left with a large volume, and the voice of the participant displayed on the right image display means 14 is heard from the right with a large volume. In addition, the voices of the other participants who are not displayed are heard from the front inner part with a small volume.

In the embodiments described above, it was assumed for the sake of convenience that the group work is carried out by three participants (operators). However, it is of course possible to similarly apply the present invention to the case where the group work is to be carried out by four or more participants. Furthermore, although it was described that the image pickup means and the image display means are respectively provided, one each, on the right and left, but it is of course possible to use two or more or each.

Figure 9:
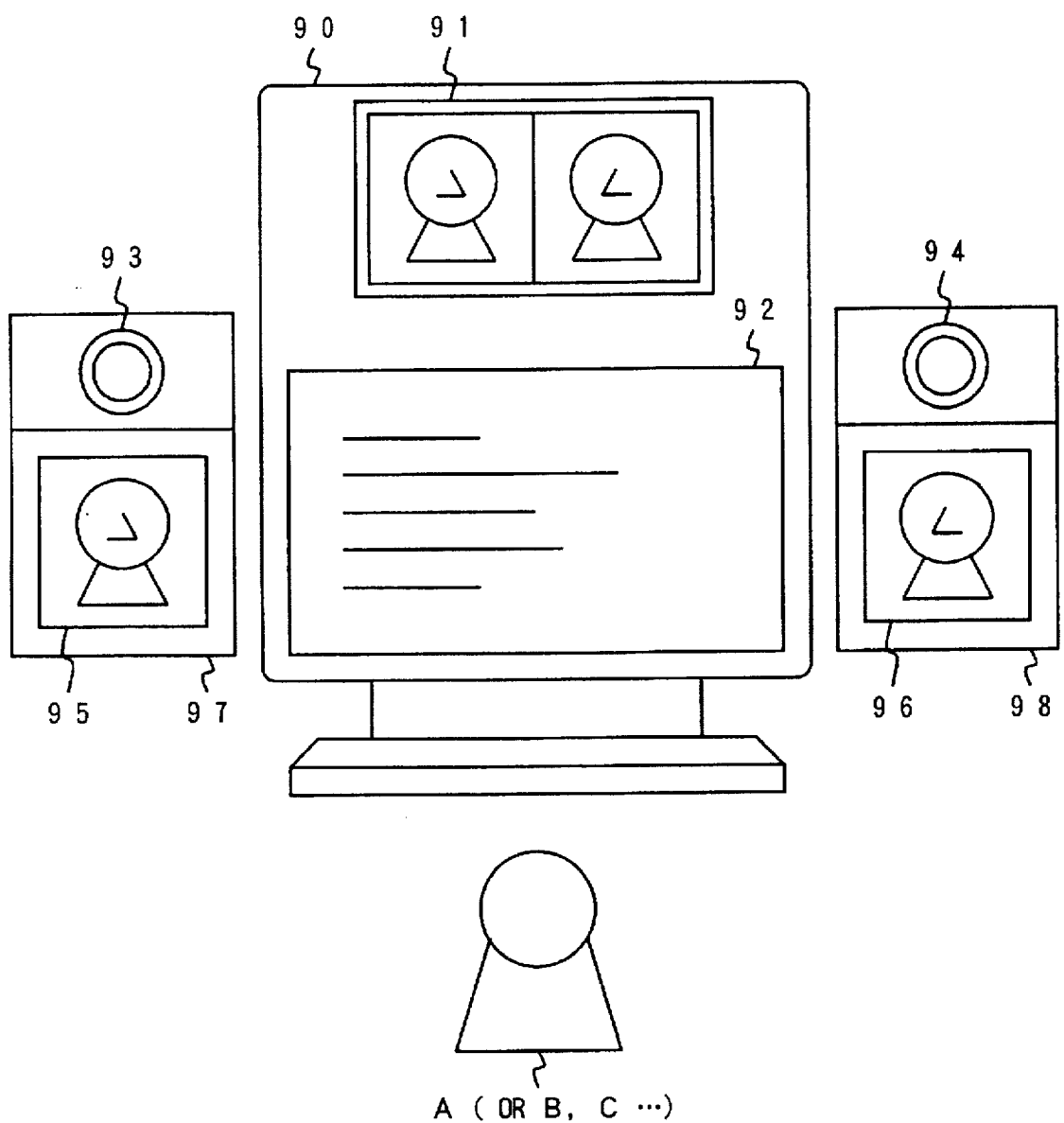
FIG. 9 is a diagram for explaining an image display system employing the present invention.

Next, a description will be given of an image display system employing the present invention, by referring to FIG. 9. FIG. 9 shows the image display system employing the present invention.

In FIG. 9, a work station at each work location, that is, the work station belonging to each participant, includes a display 90 having a conversation window 91 and a work window 92. Compact video cameras 93 and 94 are provided on the left and right of the work station, and liquid crystal display (LCD) screens 95 and 96 are respectively provided below the corresponding compact video cameras 93 and 94.

In other words, each work station has a conversation window 91 that can be displayed on the display 90, an image pickup/display unit 97 on the left of the display 90, and an image pickup/display unit 98 on the right of the display 90. The compact video camera 93 and the LCD screen 95 are integrally provided as a unit in the image pickup/display unit 97. Similarly, the compact video camera 94 and the LCD screen 98 are integrally provided as a unit in the image pickup/display unit 98.

The conversation window 91 is divided into two sections to the right and left, and the image of one participant can be displayed within each section. The two compact video cameras 93 and 94 are respectively arranged on the left and right of the display 90 and face the participant. By arranging the compact video cameras 93 and 94 to the left and right, it is possible to pick up the oblique images of the participant from the left and right. In addition, when the participant turns his head and looks at the compact video camera 93 or 94, it is also possible to pick up the front image of the participant.

On the other hand, by arranging the two LCD screens 95 and 96 immediately below the corresponding compact video cameras 93 and 94, the image of the participant looking into the compact video camera 93 or 94 can be displayed on the LCD screen 95 or 96 of another participant, so that an approximate eye contact can be made.

(1) Display Restrictions of the Conversation Window and the LCD Screens:

The same participant displayed in the left (right) section of the conversation window 91 is displayed on the conversation windows 91 of each of the work stations; that is of each of the participants, and in addition, the same participant displayed on the left (right) LCD screen 95 (96), is displayed on each of the work stations. Of course, the images of the same participant may mean that the images relate to the same participant but as picked up by different video cameras. In other words, the participant displayed in one section on one side of the conversation window 91 and the participant displayed on one of the LCD screens 95 and 96 on the same side are the same for each participant, that is, the same at each work station. Hence, even if the video conference is made by three or more participants, only up to two participants are displayed at each work station at one time. In addition, when the image of the participant himself is displayed with respect to him, the image from the compact video camera 93 or 94 is not directly displayed but converted into a mirror image before the display.

(2) Detection of the Speaker:

Depending on the situation, two participants who are actively speaking are selected and displayed. In other words, in principle, only the speaking participants are displayed. When no participant is speaking, the two participants who last spoke continue to be displayed for the sake of convenience. When a participant newly speaks, an appropriate one of the two participants presently being displayed is replaced by this new participant. Hence, the display position of the participant is not limited to one side, and may be displayed on the left at one time and displayed on the right at another time. If three or more participants are actively speaking, the display of the participants successively switches to those participants who are actively speaking.

In the video conference, the voices of the respective participants are picked up by individual microphones and are not mixed, thereby making it easy to detect the start and end of each one's speech. If congestion of the transmission occurs due to three or more participants speaking at the same time, the participant who newly started a speech is given priority over the others so as to replace the participant who started the speech earlier, out of the two participants who had been previously speaking.

(3) Direction of the Speaker:

The "conference mode" refers to the mode that is mainly concerned with the work and the conversation is secondary, and the "discussion mode" refers to the mode that is mainly concerned with the conversation and the work is secondary. In each mode, the following assumptions are made.

[Image Pickup Restriction 1]: It is assumed that in the conference mode, the speaker faces the display 90.

[Image Pickup Restriction 2]: It is assumed that in the discussion mode, the speaker is facing the right (left) video camera 94 (93) if his image is displayed in the left (right) section of the conversation window 91 or on the left (right) LCD screen 95 (96).

This assumption is made for the following reasons. That is, when group work is being performed in the conference mode, it is safe to assume that the progress in the group work is made by use of other applications on the display 90. Hence, in the conference mode, it may be assumed that each participant faces the display 90 on the other hand, when the group work is being performed in the discussion mode, it is safe to assume that the participant in the discussion conducts the discussion with the speaker (other participant) by using the image pickup/display units 97 and 98 on the side as videophones. If this participant is displayed on the left (right), the speaker will be displayed on the right (left). In this state, it would be natural for the participant to face the image of the speaker, and thus, it may be assumed that the participant is facing the right (left) video camera 96 (95).

(4) Display on the Conversation Window:

The images picked up by the video cameras 93 and 94 are displayed on the conversation window 91 under the following conditions.

[Display Condition 1a]: When displaying the image of the participant A who is speaking in the left (right) section of the conversation window 91 of this participant A, the mirror image of the image from the left (right) video camera 93 (94) is displayed.

[Display Condition 2a]: When displaying the image of the participant A who is speaking in the left (right) section of the conversation window 91 of the other participant B with whom the participant A is discussing, the image from the right (left) video camera 94 (93) is displayed.

[Display Condition 3a]: When displaying the image of the participant who is speaking in the left (right) section of the conversation window 91 of the participant C who is not speaking, the mirror image of the image from the left (right) video camera 93 (94) is displayed.

(5) Display on the LCD Screen:

The images picked up by the video cameras 93 and 94 are displayed on the LCD screens 95 and 96 under the following conditions.

[Display Condition 1b]: When displaying the image of the participant A who is speaking on the left (right) LCD screen 95 (96) of this participant A, the mirror image of the image from the left (right) video camera 93 (94) is displayed.

[Display Condition 2b]: When displaying the image of the participant A who is speaking on the left (right) LCD screen 95 (96) of the other participant B with whom the participant A is discussing, the image from the right (left) video camera 94 (93) is displayed.

[Display Condition 3b]: When displaying the image of the participant who is speaking in the left (right) LCD screen 95 (96) of the participant C who is not speaking, the image from the right (left) video camera 94 (93) is displayed.

Only the display condition 3b substantially differs from the display condition 3a for the conversation window 91. In other words, the images displayed on the left (right) LCD screen 95 (96) and the image displayed in the left (right) section of the conversation window 91 are the same when the participant is speaking, but when the participant is not speaking, the images are related to the same participant but are picked up by video cameras on different sides.

(6) Image From the Video Camera:

The images from the video cameras 93 and 94 are as follows.

[Image Pickup Effect 1A]: The image of the participant picked up by the left (right) video camera 94 (94) faces obliquely to the left (right) when the participant is watching the display 90.

[Image Pickup Effect 2A]: The image of the participant picked up by the left (right) video camera 93 (94) faces immediately to the front when the participant is facing the video camera 93 (94).

[Image Pickup Effect 3A]: The image of the participant picked up by the left (right) video camera 93 (94) faces left (right) when the participant is facing in the direction opposite to the video camera 93 (94).

On the other hand, the following can be said of the mirror images.

[Image Pickup Effect 1B]: The mirror image of the participant picked up by the left (right) video camera 93 (94) faces obliquely to the right (left) when the participant is watching the display 90.

[Image Pickup Effect 2B]: The mirror image of the participant picked up by the left (right) video camera 93 (94) faces immediately to the front with the right and left sides are reversed when the participant is facing in the direction opposite to the video camera 94 (93).

[Image Pickup Effect 3B]: The mirror image of the participant picked up by the left (right) video camera 93 (94) faces the right (left) with the right and left sides reversed when the participant is facing in the direction opposite to the video camera 94 (93).

(7) Modeless Image Display:

In the conference mode, the two participants who are speaking are displayed in the conversation window 91 of the display 90 as if these participants are facing each other and discussing. In addition, the image of the participant who is displayed on his display 90 becomes a mirror image of himself for the following reasons.

The displayed image of the participant who is speaking is the mirror image facing obliquely to the right (left) when the display is made in the left (right) section of the conversation window 91 of his own work station, because the image under the image pickup condition 1 and the display condition 1a have the image pickup effect 1B. On the other hand, the displayed image of the participant who is speaking faces obliquely to the right (left) when the display is made in the left (right) section of the conversation window 91 of the work station belonging to another participant who is speaking, because the image under the image pickup condition i and the display condition 2a have the image pickup effect 1A.

The displayed image of the participant who is speaking is the mirror image facing obliquely to the right (left) when the display is made in the left (right) section of the conversation window 91 of the work station belonging to another participant who is not speaking, because the image under the image pickup condition 1 and the display condition 3a have the image pickup effect 1B. It is not always desirable that the mirror image is obtained in this last case, but the display of the mirror image in this case is tolerable. In this case, the image of the participant who is speaking, picked up by the other video camera 94 (93) and facing obliquely to the right (left), is displayed on the LCD screen 95 (96); this image is not a mirror image.

On the other hand, in the discussion mode, the other participant conducting the discussion is displayed on the LCD screen 95 or 96 facing immediately to the front, so that the eye contact can easily be made. In addition, on the display 90, the two participants conducting the discussion are displayed in the conversation window 91 facing each other. The display is made in this manner for the following reasons.

The image of the participant who is speaking (that is, the speaker) and is displayed on the LCD screen 95 (96) of the other participant to whom the speaker is listening is the front image of the speaker, because the image on the LCD screen 95 (96) has the image pickup effect 2A due to the image pickup restriction 2 and the display condition 2b. On the other hand, the image of the speaker displayed on the LCD screen 95 (96) of the participant who is not speaking is the front image of the speaker because the image on the LCD screen 95 (96) has the image pickup effect 2A due to the image pickup restriction 2 and the display condition 3b.

Furthermore, the image of the speaker displayed in the left (right) section of the conversation window 91 of the participant who is not speaking is the mirror image of the speaker facing the right (left) direction, because the image on the conversation window 91 has the image pickup effect 3B due to the image pickup restriction 2 and the display condition 3a. It may not always be desirable to display the mirror image in this last case, however, it would be tolerable.

The switching of the conference mode and the discussion mode can also be carried out in a simple manner.

In either mode, when the participant who is not speaking starts to speak, the image of this participant replaces the image of one participant displayed in the right or left section of the conversation window 91. When this participant who starts to speak faces the LCD screen 95 (96) which displays the other participant and this other participant also faces the LCD screen 96 (95) which displays the front image of the participant who newly started to speak, the discussion mode is started. The image of the, participant who is replaced by the image of the participant who newly started to speak, disappears from the display.

Hence, although the images of up to only two participants are displayed on the conversation window 91 and the LCD screen 95 (96) at one time, the switching of the screen by the LCD screen 95 (96) is naturally carried out in the discussion mode even if three or more participants take turns and become the speaker.

Similarly, the switching to the conference mode is also simple. If all speakers face the respective displays 90, the images of the participants displayed on the conversation windows 91 become oblique images taken from directions oblique to the right and left with respect to the front of each participant.

Therefore, regardless of whether group work is carried out in the conference mode or the discussion mode, it is possible to cope with a single image display system without making it necessary for the participants to be aware of the mode.

Further, the present invention is not limited to these embodiments, but various variations and modifications may be made without departing from the scope of the present invention.

What is claimed is:

1. A video teleconferencing system providing a video teleconference among plural participants having corresponding faces and located at respective, plural different work locations, the video teleconferencing system comprising:

at each work location, a respective image pick-up and processing unit having left and right image pick-up elements positioned at symmetrically displaced, oblique viewing angles to the left and right of a frontal view of the face of the respective participant and producing corresponding left and right picked-up images of the face of the participant and, further, processing the left and right picked-up images to produce, without conversion, corresponding left and right direct image outputs and, with conversion, corresponding left and right mirror image outputs;

at each work location, a respective image display unit having left and right image display elements selectively providing left and right image displays of an individual participant, relative to and for viewing by the respective participant;

at each work location, a respective image specifying unit specifying image outputs to be selected for display, selectively and respectively, on the left and right image display elements of the respective image display unit and in common for the image display units respectively associated with the plurality of work locations, and in accordance with selected, specific participants whose corresponding images are to be displayed, out of the plural participants of the video teleconferencing system, and in accordance with selectively displaying:

i. the corresponding image of the specific participant, as picked-up by the left image pick-up element, on the right display element and the corresponding mirror image thereof for display on the left display element, and ii. the corresponding image of the specific participant, as picked-up by the right image pick-up element, on the left display element and the corresponding mirror image thereof for display on the right display element; and a determination and selection unit determining the specific participants whose corresponding images are to be displayed on a respective one of the left and right image display elements, in common for the plural image display units on which the corresponding images of the respective, specific participants are to be displayed, the image specifying units correspondingly specifying the image outputs to be selected and displayed and the determination and selection unit, further, selecting and supplying the specified image outputs to the respective left and right image display elements of each image display unit of the plural different work locations for viewing by the respective, plural participants.

2. The video teleconferencing system as claimed in claim 1, wherein each of said image pickup elements comprises a video camera.

3. The video teleconferencing system as claimed in claim 1, wherein each of said image display units comprises a plurality of display elements respectively displaying corresponding images of a plurality of individual participants and which are arranged in a mutual, line symmetrical plane arrangement or in a plane symmetrical three-dimensional arrangement.

4. The video teleconferencing system as claimed in claim 3, wherein each of said plurality of display elements comprises a plurality of sections of a window of a display screen.

5. The video teleconferencing system as claimed in claim 1, wherein:

M image display units are provided at each of N work locations, where N>2 and 2<M<N, and said video teleconferencing system; and an image determination unit is provided for each of the N work locations, for determining the images to be displayed on said M image display units provided in one of the N work locations from the images received from said N work locations.

6. The video teleconferencing system as claimed in claim 5, wherein said image determination unit determines, as the images to be distributed to each of said N work locations, images received from M work locations at each of which a speech is newly made.

7. The video teleconferencing system as claimed in claim 1, which further comprises:

at least one voice collecting unit, provided at each work location;

an acoustic image reproducing unit, provided at each work location, reproducing sound at a plurality of positions at each work location; and an acoustic image synthesizer, provided at each work location, synthesizing acoustic images, including sound collected at each of the work locations, and outputting synthesized acoustic images to said acoustic image reproducing unit provided at each of the work locations so that a voice of a specific participant displayed on a left image display is synthesized such that the voice is heard from the left, due to acoustic image orientation, and a voice of a specific participant displayed on a right image display is synthesized such that the voice is heard from the right, due to the acoustic image orientation.

8. The video teleconferencing system as claimed in claim 1, wherein each said image pickup and processing unit, as provided in a respective work location, comprises at least a pair of video cameras, each said image display unit provided in one work location comprises at least a pair of display elements, and a pair of units respectively and integrally comprises a corresponding one of the pair of video cameras and a corresponding one of the pair of display elements, wherein the video camera and the display element within the unit are oriented, so as to face in generally the same direction.

9. The video teleconferencing system as claimed in claim 8, wherein each image display unit, as provided in a respective work location, further comprises a display screen which is independent of the display parts, and said image displays are provided on both sides of the display screen, so that the display screen faces immediately in front of the respective participant and the plural units face the certain participant at an angular displacement from the front of the certain participant.

10. A video teleconferencing system providing video teleconferences between plural participants located at respective, plural different work locations, the video teleconferencing system comprising:

plural image pick-up and processing units respectively associated with the plural different work locations, each image pick-up and processing unit at a respective work location being disposed, relatively to the respective participant thereat, for picking up left and right symmetrically angularly separated images of the respective participant and processing same to produce, without conversion, corresponding left and right direct image outputs and to produce, with conversion, corresponding left and right mirror image outputs;

plural image display units respectively associated with the plural different work locations, each image display unit having left and right display elements disposed relatively to the respective participant for providing left and right, symmetrically angularly separated image displays relatively to, and for viewing by, the respective participant;

an image specifying unit specifying, in common for each of the plural image pick-up and processing units, the image output thereof to be supplied to the plural image display units for producing an image display of the respective participant in accordance with which of the left and right symmetrically angularly separated images of the respective participant, as picked-up, is selected for display and which of the left and right image display elements is selected for providing the selected image output display; and a unit determining, from the plurality of participants, specific participants whose corresponding respective images are to be displayed at respective display elements, in common at the plural image display units respectively associated with the plural different work locations, and, further, selecting for each specific participant and in common for each of the plural image display units a respective one of the left and right display elements for display of the image of the specific participant, and supplying, in common to the plural display units for display by the respective, selected display elements, the specified ones of the left and right direct and mirror image outputs, thereby to produce displays, in common, of the corresponding images of the specific participants at the plural work locations.

11. A video teleconferencing system as recited in claim 10, wherein the determining unit determines first and second specific participants in accordance with the number of participants who are currently speaking, and wherein:

(a) if the number is 0, determines same to be the two participants who were most recently speaking;

(b) if the number is 1, determines, as the second specific participant, a participant who was most recently speaking;

(c) if the number is 2, determines the two participants who are currently speaking as the two specific participants; and (d) if the number is 3 or greater, determines the two most recently speaking participants as the first and second specific participants.

12. A video teleconferencing system as recited in claim 10 wherein the determining unit determines the specific participants based on respective activity levels of the plural participants during a selected time interval related to a currently provided image display thereof.

13. A video teleconferencing system as recited in claim 12 wherein the activity levels comprise the respective levels of speaking activities of the plural participants.

14. A video teleconferencing system as recited in claim 12, wherein the determining unit determines first and second specific participants and selects, for an image picked-up from the left of the first specific participant, the corresponding left mirror image output for providing a left image display, of the first participant, in common by each of the plural image display units and, for an image picked-up from the right of the second specific participant, the corresponding right mirror image output for providing a right image display, in common, by each of the plural image display units.

15. A video teleconferencing system as recited in claim 14, wherein the determining unit, when selecting first and second remote participants as the first and second specific participants, selects a left image output of one and a right image output of the other of the first and second remote, specific participants thereby to provide, in common at the plural image display units, left and right image outputs of the first and second remote participants, providing respective images thereof having the appearance of facing each other and thereby each conferring with the other.

16. A video teleconferencing system as recited in claim 12 wherein the determining unit determines first and second specific participants and selects, for an image picked up from the left of the first participant, the corresponding left direct image output for providing a right image display of the first participant, in common, by each of the plural image display units and, for an image picked-up from the right of the second specific participant, the corresponding left direct image output for providing a left image display, in common, by each of the plural image display units.

17. A video teleconferencing system as recited in claim 12, wherein each of the plural different work locations is a remote work location, relative to each other work location of the plural different work locations, and a local work location, relative to the respective participant located thereat, and the respective participants at the local and remote work locations correspondingly being local and remote participants.

18. A video teleconferencing system as recited in claim 17, wherein the determining unit, when determining a local participant as the specific participant, selects one of the left and right mirror image outputs of the local participant as the common image display of that local specific participant at the respective local image display unit and at all remote image display units.

* * * * *

UNITED STATES PATENT AND TRADEMARK OFFICE
CERTIFICATE OF CORRECTION

PATENT NO. : 5,675,374
DATED : October 7, 1997
INVENTOR(S) : KOHDA

It is certified that error appears in the above-identified patent and that said Letters Patent is hereby corrected as shown below:

Col. 4, line 2, change "$N<2$" to --$N \geq 2$--;
line 4, change "$2>M>N$" to --$2 \leq M \leq N$--;
line 33, change "i.e. direct images" to --(i.e., direct)--;
line 37, after "non-mirror" insert --(i.e., direct)--.

Col. 5, line 1, change "i.e. direct image" to --(i.e., "direct images")--;
line 14, delete "a remote" and after "(i.e." insert --, the local) work location--;
line 15, after "another" insert --(i.e., a remote)--;
line 22, after "local" insert --)--;
line 23, after "i.e." insert --,--;
line 24, delete "direct";
line 25, after "the" (first occurrence) insert --direct--;
line 26, change "i.e. after as it is" to --(i.e., as it is)--;
line 29, after "i.e." insert --,-- and after "local" insert --)--;
line 30, change "(i.e.) remote" to --(i.e., remote)--;
line 32, after "the" (first occurrence) insert --direct--;
line 33, change "i.e. as it is" to --(i.e., as it is)--;
line 46, after "location" insert --,--.

Col. 6, line 61, before "speakers" insert --two-- and after "the" (first occurrence) delete "two".

UNITED STATES PATENT AND TRADEMARK OFFICE
CERTIFICATE OF CORRECTION

PATENT NO. : 5,675,374
DATED : October 7, 1997
INVENTOR(S) : KOHDA

It is certified that error appears in the above-identified patent and that said Letters Patent is hereby corrected as shown below:

Col. 9, line 20, change "21" to --13--.

Col. 10, line 36, change "98" to --96--;
line 59, after "is" insert --,--.

Col. 11, line 52, change "90on" to --90. On--.

Col. 15, line 35, change "N>2" to --N≥2-- and change "2<M<N" to --2≤M≤N--.

Signed and Sealed this

Fourteenth Day of April, 1998

Attest:

BRUCE LEHMAN

Attesting Officer

Commissioner of Patents and Trademarks